United States Patent [19]

Brandenstein et al.

[11] Patent Number: 4,640,632
[45] Date of Patent: Feb. 3, 1987

[54] ARRANGEMENT FOR THE AXIAL POSITIONING AND HOLDING OF A MACHINE PART IN A THIN WALL SLEEVE OR THE LIKE

[75] Inventors: Manfred Brandenstein, Eussenheim; Hermann Hetterich, Heidenfeld; Peter Horling, Mainberg, all of Fed. Rep. of Germany

[73] Assignee: SKF Kugellagerfabriken GmbH, Schweinfurt, Fed. Rep. of Germany

[21] Appl. No.: 369,756

[22] Filed: Apr. 19, 1982

[30] Foreign Application Priority Data

Apr. 24, 1981 [DE] Fed. Rep. of Germany ... 8112196[U]

[51] Int. Cl.[4] .................. F16C 43/04; F16C 13/02; F16C 35/06
[52] U.S. Cl. .................................. 384/537; 384/543; 384/585
[58] Field of Search ............. 308/236, 189 R, 207 R, 308/178, 182, 190, 208; 384/295, 296, 490, 510, 537, 543, 585

[56] References Cited

U.S. PATENT DOCUMENTS

| | | | |
|---|---|---|---|
| 1,903,776 | 4/1933 | Clark et al. | 308/236 X |
| 2,768,725 | 10/1956 | Foulds et al. | 308/190 X |
| 2,858,174 | 10/1958 | Mitchell | 308/178 |
| 3,833,278 | 9/1974 | Green | 308/190 |
| 4,125,298 | 11/1978 | Heurich et al. | 308/236 X |
| 4,287,786 | 9/1981 | Berginski | 308/236 X |

FOREIGN PATENT DOCUMENTS 11957   6/1980   European Pat. Off. ............ 308/236

Primary Examiner—Stuart S. Levy
Assistant Examiner—Thomas R. Hannon
Attorney, Agent, or Firm—Rosen, Dainow & Jacobs

[57] ABSTRACT

The rolling bearing of a guide roller is held in the bore of a thin wall roller adapted to guide a pulley, by projections radially inwardly extending from the thin wall roller. The projections may be in the form of beads having planar surfaces in a plane normal to the axis of the bearing on the side facing the bearing, or they may be notches having one side thereof separating from the material of the roller to be forced radially inwardly to engage the sides of the bearing. The notches may be resilient, to enable the bearing to be snapped into position.

9 Claims, 5 Drawing Figures

ARRANGEMENT FOR THE AXIAL POSITIONING AND HOLDING OF A MACHINE PART IN A THIN WALL SLEEVE OR THE LIKE

This invention relates to an arrangement for the axial positioning and holding of a machine part in a thin wall sleeve or the like, especially a rolling bearing in the bore of the roller of a guide or tension roller.

In a known arrangement for the axial positioning and holding of machine parts in the bore of a sleeve or the like, the bore of the sleeve is usually provided with a shoulder on one side of the machine element, the machine part being positioned on one side by the shoulder. On the other side of the machine part either a loose cap engages the facing side of the sleeve and is held there by means of screws or the like, or the bore of the sleeve is provided with an annular groove in which a snap ring is inserted. The cap or snap ring on the one side and the shoulder of the sleeve on the other side hold the machine element in the two axial directions. This known arrangement is only satisfactory when the sleeve has adequate wall strength, and is not useful for relatively thin wall sleeves or the like.

In such cases, i.e., when relatively thin wall sleeves are employed, it is known that the end of the sleeve or the like can be radially inwardly and or outwardly flanged in order to hold and position the machine part in the axial direction either completely or only at several positions. This arrangement has the disadvantage that the axial dimension of the housing must correspond generally to the width of the machine part.

In addition, in order to mount a rolling bearing in the rolling body of a guide roller or the like, it is known to separate the bore of the rolling body in two steps. The first step is longer than the width of the rolling bearing and forms a seating surface. This step has a radially extending shoulder axially engaging one side of the rolling bearing. In order to hold the rolling bearing on its other side, the material of the rolling body over the bore of the second step is compressed in the axial direction against the rolling bearing at several positions on its circumference, so that radially inwardly directed projections are formed. Accurate positioning of the rolling bearing is practically impossible with this arrangement. The differences in the diameter of the individual steps are only slightly less than the end shortening customarily provided in rolling bearings, when the rolling body has relatively low wall strength. This means, on one hand, that only insignificant axial force can be withstood by the assembly, and, on the other hand, since the rolling bearing is pressed in the axial direction over the radial shoulder in the bore of the rolling body in assembly under some situations, exact seating of the parts one to the other cannot be achieved. At the same time the danger exist that the rolling body may be radially expanded, so that the position of its running surface is negatively affected. This danger is especially great if axial forces are present in use which could cause a further displacement of the rolling bearing.

This invention is therefore directed to the provision of the arrangement for the axial positioning and holding of a machine part in a thin wall sleeve or the like, which overcomes the above disadvantages, and which insures the satisfactory holding and positioning of the parts with respect to one another even under operating conditions in the presence of large axial forces.

In accordance with the invention, this object is achieved by providing the sleeve or the like with projections or the like produced by deforming the material in the radial direction at several positions about its circumference. These projections can, in accordance with a further feature of the invention, be in the form of beads with at least one rectilinear side surface in a plane normal to the central axis of the sleeve, or they may be formed as latches or notches which are separated from the remainder of the material of the sleeve on one side thereof.

These projections, beads or the like can be formed in the bore of the sleeve very accurately and quite deep by the use of a suitable punching tool, so that, due to the position and the size of the contact surface, satisfactory positioning and holding of the machine part is obtained.

The projections may be provided only on one side of the machine part to be held, with a customary mounting being formed on the other side for example, by peening or the like. Alternatively rows of projections may be provided on both sides of the machine part. In the use of beads, at least one row is formed first following the insertion of the machine part. If notches are provided, which are resiliently yielding in the radial direction, they may be formed before the assembly of the machine part, the machine part then springing in the axial direction from one side over the notches. The combination of a row of beads and a row of notches is of course also possible.

In order that the invention will be more clearly understood, it will now be disclosed in greater detail with reference to the accompanying drawings, wherein.

Figure 1:
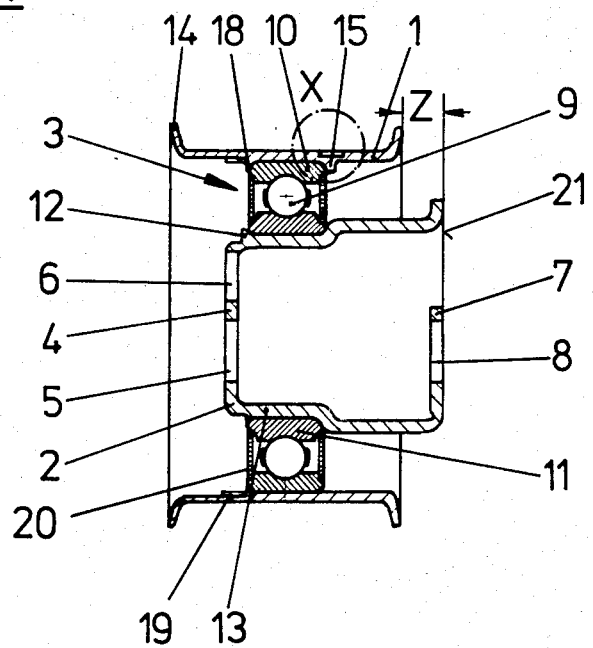
FIG. 1 is a sectional view of a guide roller in accordance with the invention.
Figure 2:
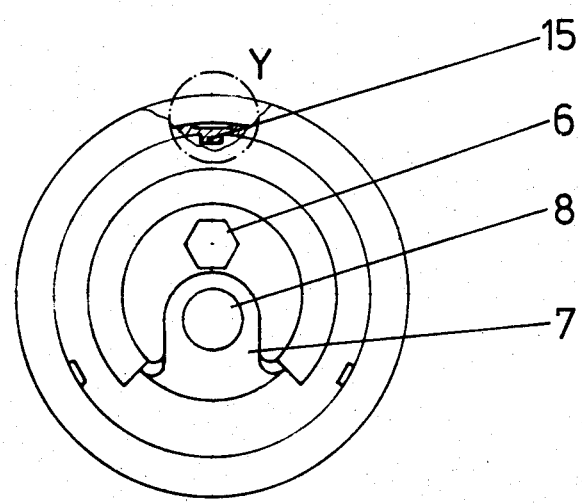
FIG. 2 is a side view of the guide roller of FIG. 1 taken from the right side thereof.
Figure 3:
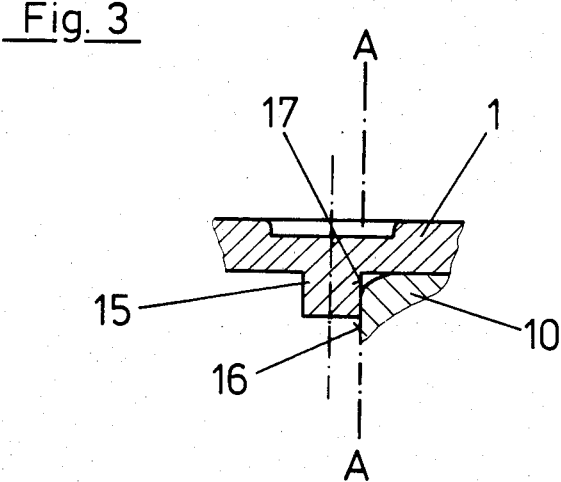
FIG. 3 is an enlarged sectional view of the portion of the guide roller of FIG. 1 in the circle X.
Figure 4:
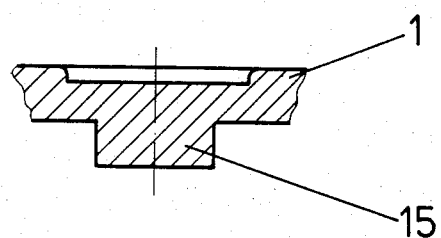
FIG. 4 is an enlarged cross sectional view of the portion of the guide roller of FIG. 2 within the circle Y.

The guide roller of FIGS. 1 and 2 is comprised of a roller 1, a support post 2 and a rolling bearing 3 arranged between the roller 1 and support post 2. The support post 2 has a base 4 on one end, the base being provided with an eccentric hole 5. The eccentric hole 5 serves as a guide surface for a screw (not shown) adapted to extend through the support post for adjustably holding the guide roller to a machine. The base 4 of the support post 2 is also provided with a key surface 6 which serves as a working surface for an adjustment tool (not shown). The end of the support post 2 opposite the base 4 is provided with a substantially radially inwardly directed tongue 7 which is formed unitarily with the support post 2 and which is provided with a hole 8 aligned with the hole 5 in the base.

The rolling bearing 3 supported on the support post 2, for rotatably holding the roller 1 has an outer ring 10 with an outer race for the balls 9, and an inner ring 11 having an inner race. The inner ring is held on a step 13 of the support post by a peened over portion 12 of the support post.

The roller 1 is formed as a unitary sleeve, both ends having outwardly extending flanges 14 for axially guiding a belt (not shown) running thereon.

In order to precisely position the rolling bearing 3 and thereby also the roller 1 with respect to the other parts of the guide roller, the roller 1 is provided with beads 15 at several positions about its circumference, formed by deforming the material of the roller 1 in the radial direction. The beads each have a rectilinear side surface 17 extending in a plane A—A at right angles to the central axis of the guide roller and engaging the facing surface 16 on the side of the outer ring. These side surfaces 17 can be produced very precisely in position and shape in the production of the beads 15 by the use of a suitable tool in the bore of the rolling body, so that the rolling bearing 3 can be very accurately positioned. As noted in FIGS. 1-4, the recesses formed by deforming the material of the roller 1 are axially longer and circumferentially wider than the beads 15.

In order to position the rolling body 3 in the other axial direction, material for the formation of lugs 18 is squeezed from the step 19 in the bore of the rolling body 1 against the other side surface 20 of the outer ring 10 at several positions about its circumference, by the use of an axially directed stamp.

It is readily possible to maintain the dimension "Z" between the side surface of the one flange 14 and the wall 21 of the machine on which the guide roller is mounted, by the accurate production of the beads 15, especially the side surface 17 facing the rolling bearing.

Figure 5:
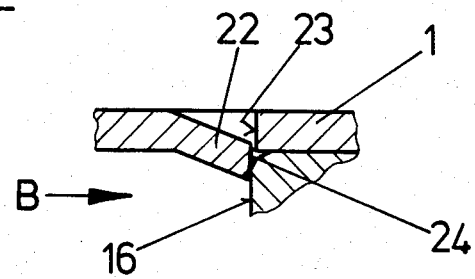
FIG. 5 is an enlarged cross sectional view of a modification of the projection for positioning and holding the rolling bearing.

In the embodiment of the invention illustrated in FIG. 5, instead of beads 15, a notch 22 is provided which is likewise formed by forming the material of the roller in the radial direction. The notch 22 is separated from the remaining material of the rolling body 1 at the position 23, so that an enclosing surface 24 for the side surface 16 of the outer ring 10 of the rolling bearing 3 is provided. Such a notch has the advantage that it is resiliently yielding in the radial direction. As a result of this it is possible to push the rolling bearing in the direction of the arrow B, whereby the notches 22 yield in the radial outer direction, and then, after the further insertion of the rolling bearing 3, spring back radially inwardly. The rolling bearing 3 is thereby axially held and positioned.

While the invention has been disclosed and described with reference to a limited number of embodiments, it is apparent that variations and modification may be made therein, and that it is intended in the following claims to cover each such variation and modification that falls within the true spirit and scope of the invention.

What is claimed is:

1. In an arrangement for axially positioning and holding a machine element in a thin wall sleeve having a bore therethrough the improvement wherein the sleeve material is radially inwardly deformed at several circumferential positions of the sleeve to form radially inwardly directed projections each having a rectilinear end surface toward the machine element extending in a radial plane and formed by radial deformation with a tool in said bore, for axially positioning and holding the sleeve and machine element with respect to one another, whereby said rectilinear surfaces are formed without additional processing of the sleeve.

2. The arrangement of claim 1 wherein said thin wall sleeve is a roller of a guide roller, and said machine element comprises a rolling bearing having a central axis and held within the bore of said roller.

3. The arrangements of claim 2 wherein said projections are in the form of beads forced radially inwardly from the material of said roller, and have planar sides in a plane normal to the central axis of the bearing on the sides thereof facing the bearing.

4. The arrangement of claim 2 wherein said projections are in the form of notches with a side thereof separated from the material of said roller to engage a side of said bearing.

5. The arrangement of claim 4 wherein said notches are resilient, whereby said bearing may be installed axially in the bore of said roller with said notches resiliently snapping inwardly to hold said bearing at a determined position thereof.

6. The arrangement of claim 1 wherein the thin wall sleeve has an outer surface and recesses formed by the radially inwardly deformation to form said projections have bottoms substantially parallel to the radially outer surface of the sleeve.

7. The arrangement of claim 1 wherein the radially inwardly directed projections are formed solely by radial deformation.

8. The arrangment of claim 1 wherein the machine element is further held at an opposite side from the projection by lugs formed by axially deformation of the radially inner surface of the sleeve.

9. The arrangement of claim 1 wherein recesses are formed in the radial outer surface of the sleeve by deformation to form the projections, the recesses being axially longer and wider than the projections.

* * * * *

UNITED STATES PATENT AND TRADEMARK OFFICE
CERTIFICATE OF CORRECTION

PATENT NO. : 4,640,632

DATED : February 3, 1987

INVENTOR(S) : Brandenstein et al.

It is certified that error appears in the above-identified patent and that said Letters Patent is hereby corrected as shown below:

Column 1, line 57, change "exist" to --exists.

Column 4, line 15, after "sleeve is a" omit -- roller of a --.

Column 4, line 42, change "axially" to -- axial --.

Signed and Sealed this

Twenty-second Day of December, 1987

Attest:

DONALD J. QUIGG

Attesting Officer

Commissioner of Patents and Trademarks